US010102331B2

(12) United States Patent
Mawby et al.

(10) Patent No.: US 10,102,331 B2
(45) Date of Patent: Oct. 16, 2018

(54) DETERMINING BOOLEAN REGION PARTICIPANTS FOR A NOTIONAL CONTEXT GIVEN ARBITRARY BODIES

(75) Inventors: Eric Mawby, Windham, NH (US); Feng Yu, Irvine, CA (US); Hui Qin, Shanghai (CN)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1062 days.

(21) Appl. No.: 13/564,000

(22) Filed: Aug. 1, 2012

(65) Prior Publication Data
US 2013/0297268 A1 Nov. 7, 2013

Related U.S. Application Data

(60) Provisional application No. 61/643,163, filed on May 4, 2012.

(51) Int. Cl.
*G06F 17/50* (2006.01)
*G06T 17/10* (2006.01)
(Continued)

(52) U.S. Cl.
CPC ............ *G06F 17/509* (2013.01); *G06T 17/10* (2013.01); *G06T 19/00* (2013.01); *G06T 19/20* (2013.01);
(Continued)

(58) Field of Classification Search
CPC ... G06F 17/509; G06F 2217/42; G06T 19/00; G06T 17/10; G06T 19/20; G06T 2219/2021
(Continued)

(56) References Cited

U.S. PATENT DOCUMENTS 6,078,330 A 6/2000 Masuda et al.
6,307,555 B1 * 10/2001 Lee .................. G06T 17/20
345/421
(Continued)

FOREIGN PATENT DOCUMENTS

CN 1858803 A 11/2006
CN 101320486 A 12/2008
(Continued)

OTHER PUBLICATIONS

Masatake Higashi, et al., "Robust algorithms for face-based representations", 1997, Computer-Aided Design 29.2, pp. 135-146.*
(Continued)

*Primary Examiner* — Juan Ochoa

(57) ABSTRACT

Product Data Management (PDM) systems and methods. A method includes receiving a target body and a tool body, and evaluating a body type of the target body and a body type of the tool body. The method includes evaluating interactions between the target body and the tool body, and applying comparison criteria to determine spatial relation and relative convexity of an intersection between the target body and the tool body. The method includes identifying tool face regions of the tool body based on the evaluations and the determined spatial relation and relative convexity of the intersection. The method includes adding the tool face regions to the target body to produce a modified target body.

17 Claims, 10 Drawing Sheets

(51) Int. Cl.
*G06T 19/20* (2011.01)
*G06T 19/00* (2011.01)

(52) U.S. Cl.
CPC .. *G06F 2217/42* (2013.01); *G06T 2219/2021* (2013.01)

(58) Field of Classification Search
USPC .......................................................... 703/1
See application file for complete search history.

(56) References Cited

U.S. PATENT DOCUMENTS

| | | | |
|---|---|---|---|
| 6,629,065 B1* | 9/2003 | Gadh et al. ...................... 703/1 |
| 7,176,942 B2* | 2/2007 | Chartier et al. ............... 345/619 |
| 7,337,093 B2* | 2/2008 | Ramani .................. G06F 17/50 345/427 |
| 7,397,473 B2* | 7/2008 | Chakraborty ................. 345/419 |
| 7,663,625 B2* | 2/2010 | Chartier et al. ............... 345/440 |
| 7,850,451 B2* | 12/2010 | Wiechmann ........... A61C 7/002 433/24 |
| 2001/0043236 A1 | 11/2001 | Yamamoto |
| 2002/0183878 A1 | 12/2002 | Chartier et al. |
| 2009/0259440 A1* | 10/2009 | Reed ....................... G06F 17/50 703/1 |
| 2011/0098982 A1* | 4/2011 | Artur ..................... G06F 17/50 703/1 |
| 2012/0007864 A1 | 1/2012 | Lonsdale Nanson et al. |
| 2012/0015315 A1* | 1/2012 | Wiechmann ........... A61C 7/002 433/8 |
| 2013/0060530 A1* | 3/2013 | Sen ........................ G06F 17/50 703/1 |

FOREIGN PATENT DOCUMENTS

| | | |
|---|---|---|
| JP | H01222379 A | 9/1989 |
| JP | H07200873 A | 8/1995 |
| JP | 2002324103 A | 11/2002 |
| JP | 2003162550 A | 6/2003 |

OTHER PUBLICATIONS

Steven Fortune, "Polyhedral modelling with multiprecision integer arithmetic", 1997, Computer-Aided Design 29.2, pp. 123-133.*
Kevin Weiler, "Edge-based data structures for solid modeling in curved-surface environments", 1985, Computer Graphics and Applications, IEEE 5.1, pp. 21-40.*
Higashi, M et al: "Face-Based Data Structure and its Application to Robust Geometric Modeling", Third Symposium on Solid Modeling and Applications, Salt Lake City, May 17-19, 1995, [Proceedings of the Symposium on Solid Modeling and Applications], New York, ACM, US, vol. Symp. 3, May 17, 1995, pp. 235-246 (12 pages), CP000530123, DOI: 10.1145/218013.218068, ISBN: 978-0-89791-672-1.
Bruderlin, B: "Robust Regularized Set Operations on Polyhedra", 19910108-1991011, vol. i, Jan. 8, 1991, pp. 691-700 (10 pages), XP010093302.
Waco, D.L. et al.: "Geometric Reasoning for Machining Features Using Convex Decomposition", Computer Aided Design, Elsevier Publishers BV., Barking, GB, vol. 26, No. 6, Jun. 1, 1994, pp. 477-489 (13 pages), XP000453434, ISSN: 0010-4485, DOI: 10.1016/0010-4485 (94) 90069-8.
Liu, S Q et al.: "Real-Time, Dynamic Level-of-Detail Management for Three-Axis NC Milling Simulation", Computer Aided Design, Elsevier Publishers BV, Barking, GB vol. 38, No. 4, Apr. 1, 2006, pp. 378-391 (14 pages), XP027878698, ISSN: 0010-4485.
PCT Search Report for Appl. No. PCT/US2013/038315, dated Jul. 15, 2013 (13 pages).
CN Office Action dated Jul. 6, 2016, for CN Application No. 201380023086.3, 13 pages.
Japanese Decision to Grant dated Apr. 17, 2017, for JP Application No. 2015-510339, 2 pages.

* cited by examiner

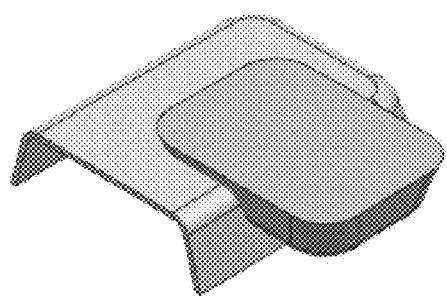
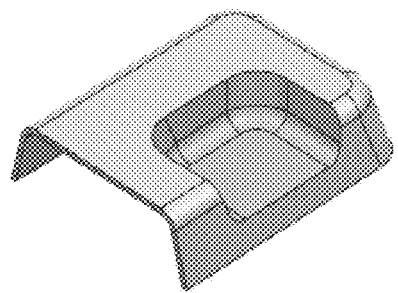
FIG. 7A FIG. 7B
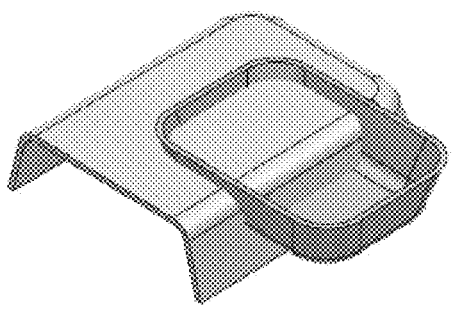
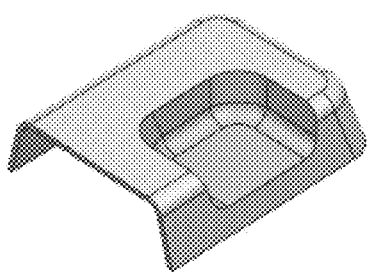
FIG. 7C FIG. 7D
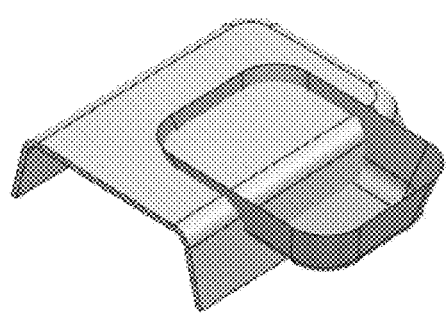
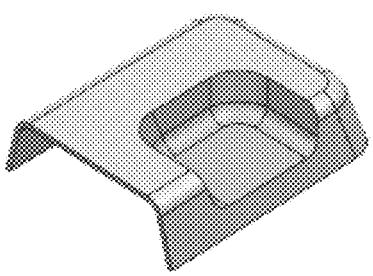
FIG. 7E FIG. 7F

DETERMINING BOOLEAN REGION PARTICIPANTS FOR A NOTIONAL CONTEXT GIVEN ARBITRARY BODIES

This application claims the benefit of the filing date of U.S. Provisional Patent Application 61/643,163, filed May 4, 2012, which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include systems and methods for determining Boolean region participants for a notional context given arbitrary bodies in CAD object models.

Various disclosed embodiments include PDM systems and methods. A method includes receiving a target body and a tool body, and evaluating a body type of the target body and a body type of the tool body. The method includes evaluating interactions between the target body and the tool body, and applying comparison criteria to determine spatial relation and relative convexity of an intersection between the target body and the tool body. The method includes identifying tool face regions of the tool body based on the evaluations and the determined spatial relation and relative convexity of the intersection. The method includes adding the tool face regions to the target body to produce a modified target body.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1-7 and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In a PDM or CAD context, it can be advantageous to perform a Boolean operation to "subtract" a shape from an object model. When performing an operation to remove a "tool body" from a "target body", it can be important to ensure that proper regions of the target body are removed, and that other portions of the target body are modified to properly reflect the operation, such as by adding appropriate faces to the target body that bound the region removed by the tool body.

Disclosed embodiments include computer-implemented processes that can determine what regions of an arbitrary target body and arbitrary tool body participate in a Boolean operation, and modify the target body appropriately.

Figure 1:
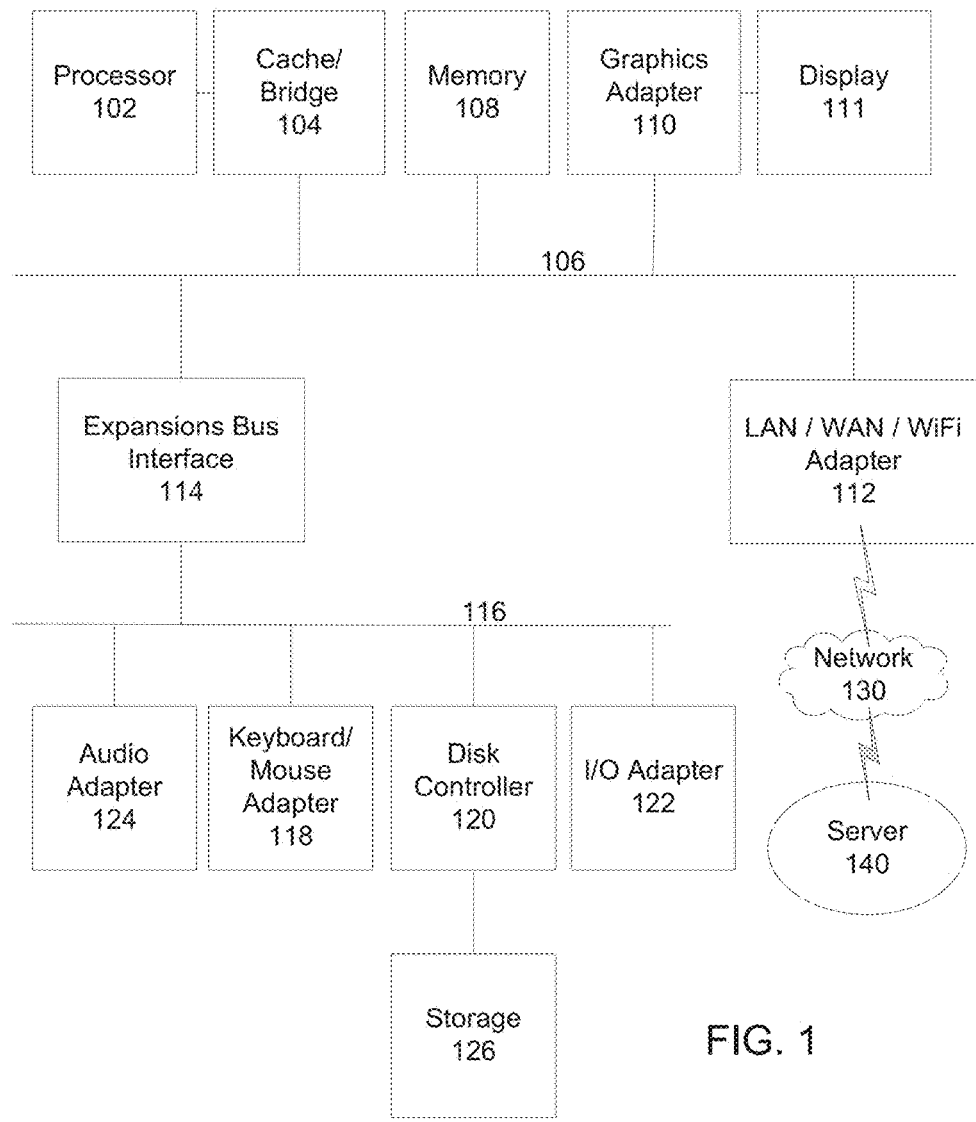
FIG. 1 depicts a block diagram of a data processing system in which an embodiment can be implemented.

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described. LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Various embodiments include systems and methods to determine what regions of an arbitrary target body and arbitrary tool body participate in a Boolean operation, such as with regard to a specific context.

Figure 2A:
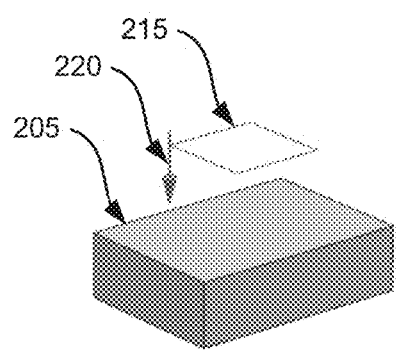
FIGS. 2A and 2B illustrate a pocket feature in a target body, in accordance with disclosed embodiments.
Figure 2B:
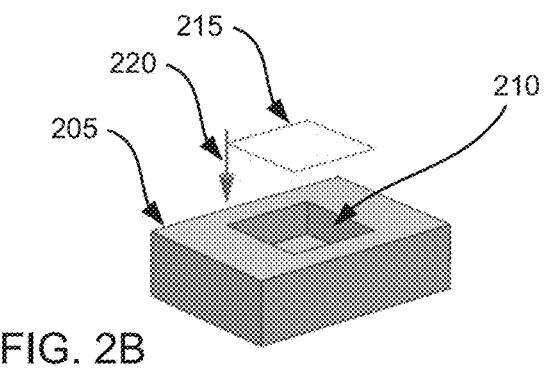

The NX software product by Siemens Product Lifecycle Management Software Inc. and other CAD modeling packages provide numerous modeling features used to construct a part. A popular variety of feature is a profile-based feature. FIGS. 2A and 2B illustrate a "Pocket" feature 210 in a target body 205.

A profile-based feature contains a "recipe" of ingredients and instructions for how to construct a feature. The example Pocket feature collects input such as a target body 205 to which the pocket 210 should be added, a profile for the shape of the pocket 210 (illustrated as square 215), a direction and distance to sweep a tool body from the profile (illustrated as arrow 220), and a Boolean instruction to combine the target and tool bodies. The recipe is concise; it expects exactly the ingredients required to produce a pocket and then produces a pocket.

While profile-based features are convenient, explicit methods of modeling—explicitly construct target and tool bodies and explicitly combine with a Boolean operation—remain prevalent.

Figure 3A:
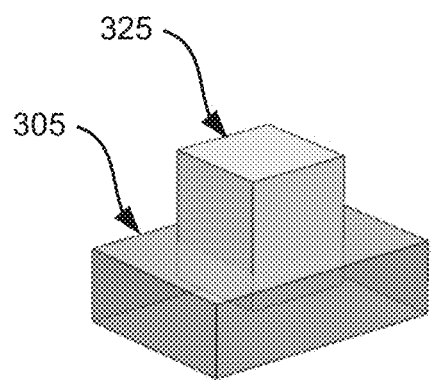
FIGS. 3A and 3B illustrate two exemplary bodies, in accordance with disclosed embodiments.
Figure 3B:
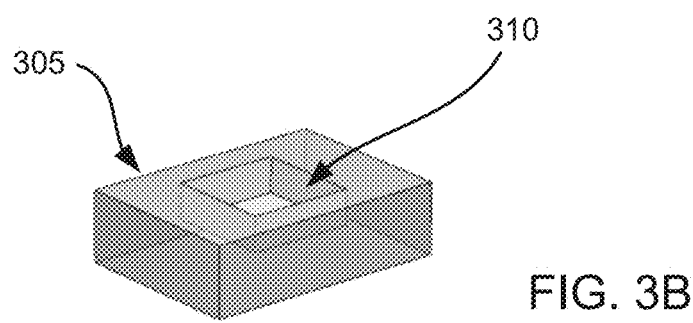

FIGS. 3A and 3B illustrate two exemplary bodies. Consider an operation to combine these bodies such that the "tool" body 325 becomes a pocket on the "target" body 305. Where the profile-based feature the tool body 325 was constructed for the purpose of producing a pocket, the bodies in this example are arbitrary and could be used for any operation. "Pocket" is a notional context only, unlike the prescribed context of the profile-based feature.

Given a notion of "pocket" and a context where body 305 is a target and body 325 is a tool, producing a pocket 310 can be considered as a Boolean operation that subtracts the tool body 325 from the target body 305 to produce the result illustrated in FIG. 3B. This is a human view. An "algorithm" view as executed by a PDM system process cannot assume that a tool is simply subtracted to produce a pocket. The notional context of "pocket" only means the target remains an overall convex form and the tool produces a locally concave feature in the target. These two bodies could also participate, for example, in a notional context of "pad."

Figure 4A:
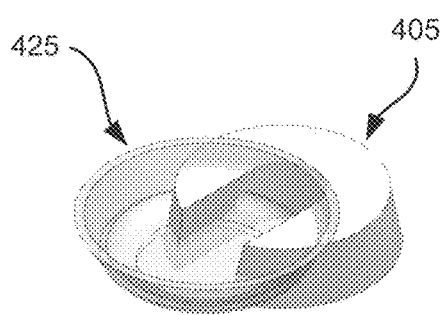
FIGS. 4A-4D illustrate an example of an operation in accordance with disclosed embodiments.
Figure 4B:
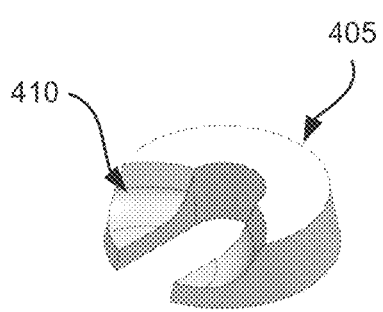
Figure 4C:
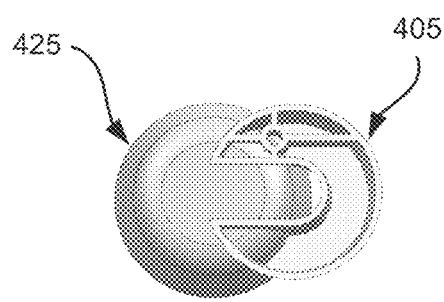
Figure 4D:
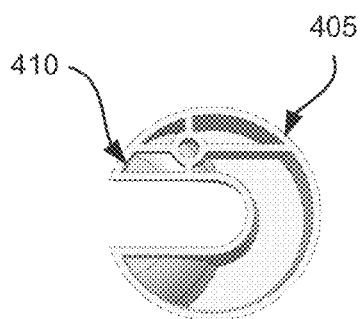

FIGS. 4A-4D illustrate a more sophisticated example of such an operation, with FIGS. 4A and 4C showing an oblique "top" view and FIGS. 4B and 4D showing a "bottom" view. The task is to modify the target body 405 with the tool body 425 to produce the "feature" 410 shown in FIGS. 4B and 4D.

This example is not achieved by simply subtracting a tool from a target. The notional context of the target remains an overall convex form and the tool produces a locally concave feature in the target, which is notionally a "pocket," but notice how the thickness of the tool produces a void on the "near" side of the target while adding wall thickness on the "far" side.

In the human view it may be apparent how the tool should modify the target given the a priori notion of the product; after all, a human modeled the bodies with a purpose in mind. However, spatial senses such as "near" and "far" side, geometric descriptions of "pocket" or "wall," and decisions of what regions of which bodies remain or are removed, are perceptual.

Disclosed embodiments include computer-implemented processes that can determine what regions of an arbitrary target body and arbitrary tool body participate in a Boolean operation given a notional context. Programmatically the algorithm can simulate the human view, to interpret notion and perception, given the arbitrary bodies.

Disclosed embodiments are particularly but not exclusively advantageous when dealing with thin-wall bodies. The bodies may be solid or sheet in any combination. A solid body may be thin-wall or "thick"; where "thick" only means it is not a characteristic thin-wall body.

Figure 5:
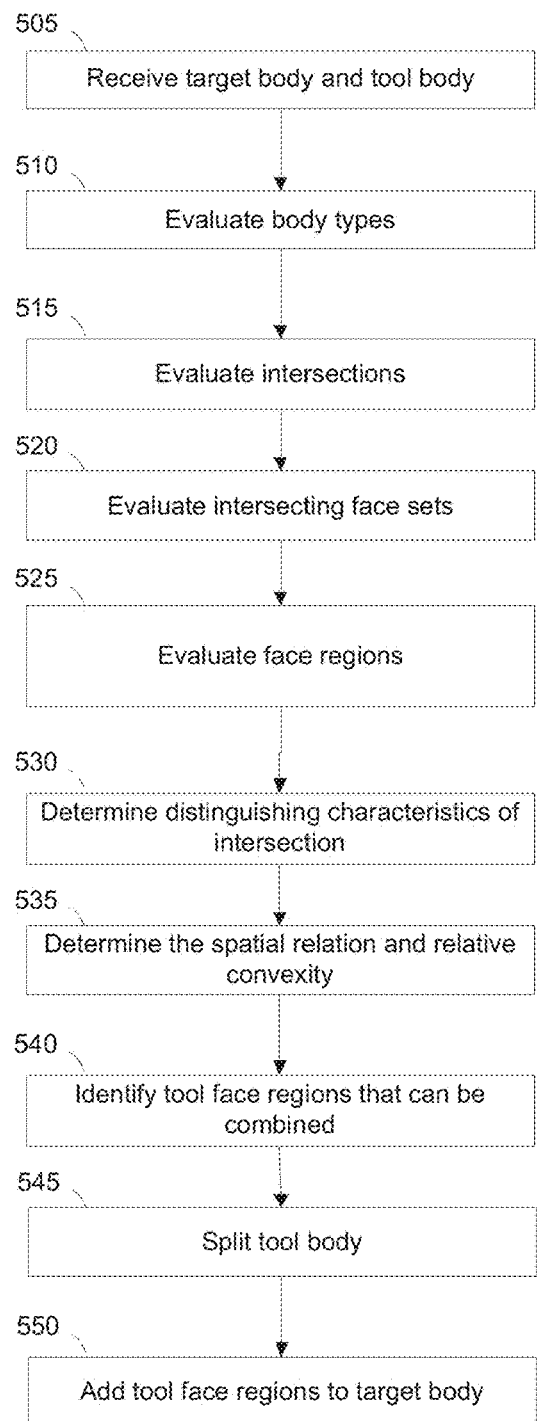
FIG. 5 depicts a flowchart of a process in accordance with disclosed embodiments.

FIG. 5 depicts a flowchart of a process in accordance with disclosed embodiments. Various steps of this process are described with reference to a non-limiting example as depicted in FIGS. 6A-6G. This process analyzes a target body 605 and a tool body 625 to produce a "notional feature" 610 to be added to the target body 625, the notional feature 610 representing the result of a Boolean region operation between the target body 605 and the tool body 625. In this example, the notional feature is am "emboss" (pocket, depression, generally a locally concave form).

In this process, the "system" refers to a PDM data processing system configured or programmed to perform the various actions described below.

Figure 6A:
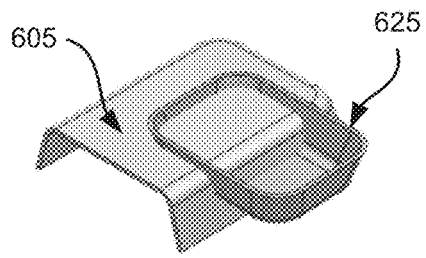
FIGS. 6A-6G depict example bodies used to illustrate a process in accordance with disclosed embodiments.
Figure 6B:
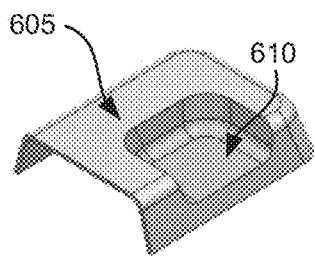
Figure 6C:
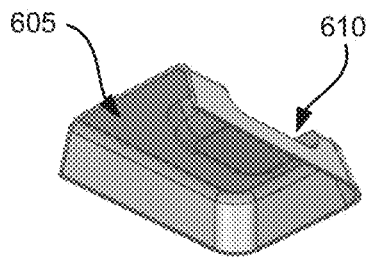

The system receives a target body and a tool body (step 505). These bodies can be three-dimensional object model bodies in the PDM system. "Receiving" as used herein, can include loading from storage, receiving from another device or process, receiving via an interaction with a user, or otherwise. FIG. 6A shows a target body 605 intersecting a tool body 625. As part of this step, the system can receive a user selection to produce a resulting model including notional feature 610, as illustrated in the example of FIGS. 6B and 6C.

The system can evaluate the respective body types of the target body and the tool body (step 510). This can include determining if each body is a solid or a sheet.

The system can evaluate the number of, geometric characteristics of, and topological characteristics of the intersections between the target body and the tool body (step 515).

Figure 6D:
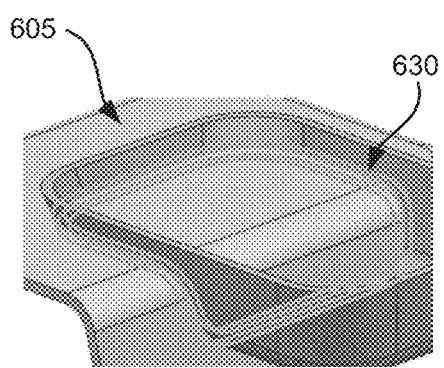
Figure 6E:
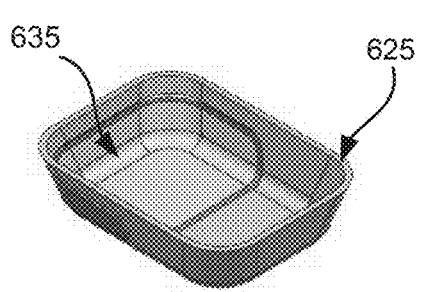
Figure 6F:
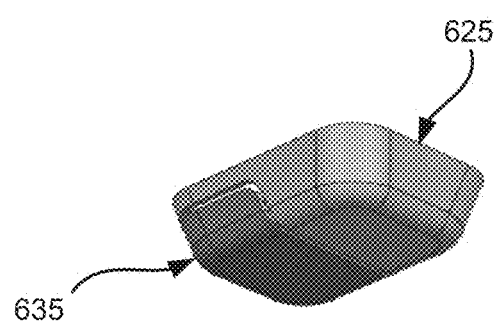

The system can evaluate the number of, geometric characteristics of, and topological characteristics of the intersecting face sets between the target body and the tool body (step 520). This step can include identifying face loops 630 between the target body and tool body, as illustrated in FIG. 6D. These face loops correspond to the intersections between the respective faces of the target body and the tool body, and can be identified mathematically by the system since it knows the location of each of the faces.

The system can evaluate the number of, geometric characteristics of, and topological characteristics of the face regions of the target body and the tool body (step 525).

One or more of steps 515-525 can be generically referred to as evaluating interactions between the target body and the tool body.

From the evaluations, the system can determine distinguishing characteristics of the intersection between the target body and the tool body (step 530).

The system can apply comparison criteria to the target body and the tool body to determine the spatial relation and relative convexity of the intersection between the target body and the tool body (step 535).

The system can identify tool face regions of the tool body that can be combined with the target body to produce a notional feature based on, for example, the evaluations and the determined spatial relation and relative convexity of the intersection (step 540). This is illustrated in the example FIGS. 6E and 6F, which show the identified tool face region 635 of tool body 625. Note that, in many cases, the region is bounded by the face loops identified above.

Figure 6G:
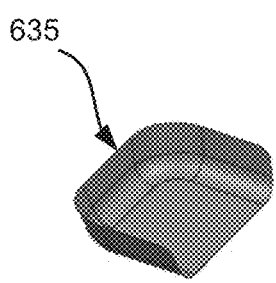

The system can "split" the tool body using the target body to produce the tool face regions 635 to be added to the target body (step 545). These regions 635, after splitting, can be maintained as a separate body as shown in FIG. 6G. Note that, in many cases, the splitting is performed along the face loops identified above.

The system can add the tool face regions 635 to the target body 605 (step 550) to produce the modified target body as a final product as shown in FIGS. 6B and 6C. This step can include removing any features (edges, faces, etc.) from the target body 605 that are "cut off" from the target body by the addition of the tool face regions 635. This step can include storing or displaying the modified target body 605.

Unless specified otherwise, the various steps described herein can be performed in a different order, performed concurrently or sequentially, can be omitted or combined, or can be repeated, as may be specified in the claims below.

Figure 7G:
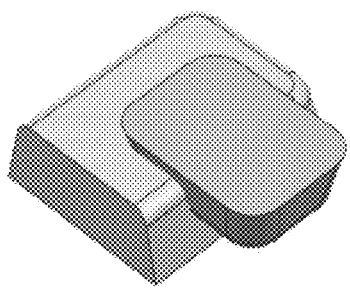
FIGS. 7A-7P depict examples of different final products produced according to disclosed processes.
Figure 7H:
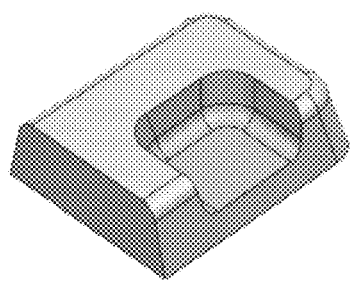
Figure 7I:
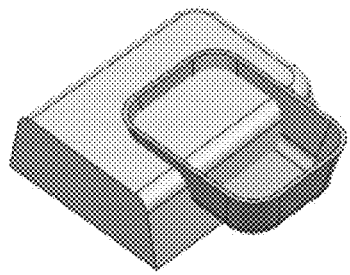
Figure 7J:
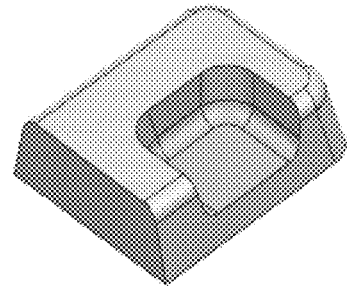
Figure 7K:
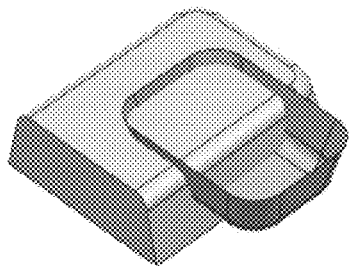
Figure 7L:
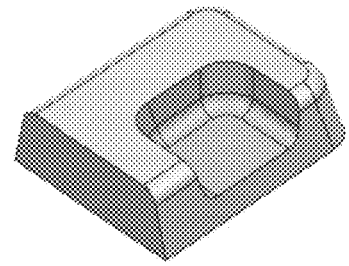
Figure 7M:
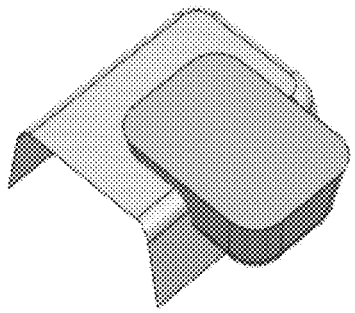
Figure 7N:
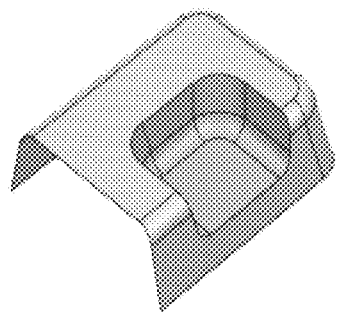
Figure 7O:
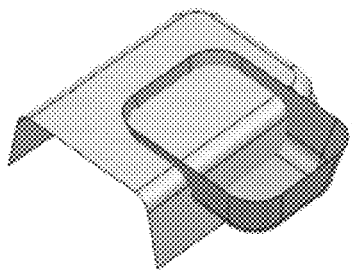
Figure 7P:
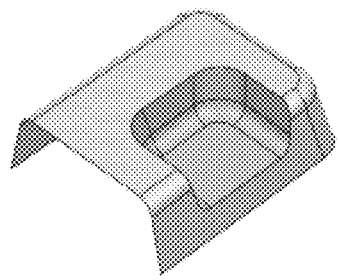

FIGS. 7A-7P depict examples of different final products produced according to disclosed processes, depending on the characteristics of the target body and tool body.

FIG. 7A shows the interaction between a thin-wall target body and a thick tool body, and FIG. 7B shows a corresponding final product of a process as disclosed herein.

FIG. 7C shows the interaction between a thin-wall target body and a thin-wall tool body, and FIG. 7D shows a corresponding final product of a process as disclosed herein.

FIG. 7E shows the interaction between a thin-wall target body and a sheet tool body, and FIG. 7F shows a corresponding final product of a process as disclosed herein.

FIG. 7G shows the interaction between a thick target body and a thick tool body, and FIG. 7H shows a corresponding final product of a process as disclosed herein.

FIG. 7I shows the interaction between a thick target body and a thin-wall tool body, and FIG. 7J shows a corresponding final product of a process as disclosed herein.

FIG. 7K shows the interaction between a thick target body and a sheet tool body, and FIG. 7L shows a corresponding final product of a process as disclosed herein.

FIG. 7M shows the interaction between a sheet target body and a thick tool body, and FIG. 7N shows a corresponding final product of a process as disclosed herein.

FIG. 7O shows the interaction between a sheet target body and a sheet tool body, and FIG. 7P shows a corresponding final product of a process as disclosed herein.

Processes as described herein can be used in systems that implement a Boolean or Boolean-like capability, where the Boolean has a notional context such as "emboss" or "pad" or "pocket" (which is a higher-order context than a primitive unite or subtract), that accepts arbitrary bodies as input, and that automatically determines how the bodies form the notional feature without explicit inputs or instructions to produce the same.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method for product data management, performed by a product data management (PDM) data processing system, comprising:
   receiving, in the PDM data processing system, a target body and a tool body;
   evaluating a body type of the target body and a body type of the tool body;
   evaluating interactions between the target body and the tool body;
   determining a spatial relation and relative convexity of an intersection between the target body and the tool body;
   identifying tool face regions of the tool body based on the evaluations and the determined spatial relation and relative convexity of the intersection;
   splitting the tool face regions from the tool body and maintaining the tool face regions as a separate body from the tool body; and
   adding the tool face regions to the target body to produce a modified target body.

2. The method of claim 1, wherein evaluating interactions between the target body and the tool body includes evaluating a number of, geometric characteristics of, and topological characteristics of the intersection between the target body and the tool body.

3. The method of claim 1, wherein evaluating interactions between the target body and the tool body includes evaluating a number of, geometric characteristics of, and topological characteristics of intersecting face sets between the target body and the tool body.

4. The method of claim 3, wherein the PDM data processing system also identifies at least one face loop between the target body and tool body that corresponds to an intersection between respective faces of the target body and the tool body.

5. The method of claim 1, wherein evaluating interactions between the target body and the tool body includes evaluating a number of, geometric characteristics of, and topological characteristics of face regions of the target body and the tool body.

6. The method of claim 1, wherein the PDM data processing system also determines distinguishing characteristics of the intersection between the target body and the tool body.

7. A product data management (PDM) data processing system, comprising:
   at least one processor; and
   an accessible memory, the PDM data processing system configured to receive a target body and a tool body;
   evaluate a body type of the target body and a body type of the tool body;
   evaluate interactions between the target body and the tool body;
   determine a spatial relation and relative convexity of an intersection between the target body and the tool body;
   identify tool face regions of the tool body based on the evaluations and the determined spatial relation and relative convexity of the intersection;
   split the tool face regions from the tool body and maintain the tool face regions as a separate body from the tool body; and
   add the tool face regions to the target body to produce a modified target body.

8. The PDM data processing system of claim 7, wherein evaluating interactions between the target body and the tool body includes evaluating a number of, geometric characteristics of, and topological characteristics of the intersection between the target body and the tool body.

9. The PDM data processing system of claim 7, wherein evaluating interactions between the target body and the tool body includes evaluating a number of, geometric characteristics of, and topological characteristics of intersecting face sets between the target body and the tool body.

10. The PDM data processing system of claim 9, wherein the PDM data processing system also identifies at least one face loop between the target body and tool body that corresponds to an intersection between respective faces of the target body and the tool body.

11. The PDM data processing system of claim 7, wherein evaluating interactions between the target body and the tool body includes evaluating a number of, geometric characteristics of, and topological characteristics of face regions of the target body and the tool body.

12. The PDM data processing system of claim 7, wherein the PDM data processing system also determines distinguishing characteristics of the intersection between the target body and the tool body.

13. A non-transitory machine-readable medium encoded with executable instructions that, when executed, cause a product data management (PDM) data processing system to:
   receive a target body and a tool body;
   evaluate a body type of the target body and a body type of the tool body;
   evaluate interactions between the target body and the tool body;
   determine a spatial relation and relative convexity of an intersection between the target body and the tool body;
   identify tool face regions of the tool body based on the evaluations and the determined spatial relation and relative convexity of the intersection;
   split the tool face regions from the tool body and maintain the tool face regions as a separate body from the tool body; and
   add the tool face regions to the target body to produce a modified target body.

14. The machine-readable medium of claim 13, wherein evaluating interactions between the target body and the tool body includes evaluating a number of, geometric characteristics of, and topological characteristics of the intersection between the target body and the tool body.

15. The machine-readable medium of claim 13, wherein evaluating interactions between the target body and the tool body includes evaluating a number of, geometric characteristics of, and topological characteristics of intersecting face sets between the target body and the tool body.

16. The machine-readable medium of claim 15, wherein the PDM data processing system also identifies at least one face loop between the target body and tool body that corresponds to an intersection between respective faces of the target body and the tool body.

17. The machine-readable medium of claim 13, wherein evaluating interactions between the target body and the tool body includes evaluating a number of, geometric characteristics of, and topological characteristics of face regions of the target body and the tool body.

* * * * *